United States Patent
Kosaka

(10) Patent No.: US 11,057,529 B1
(45) Date of Patent: Jul. 6, 2021

(54) IMAGE FORMING SYSTEM, IMAGE FORMING APPARATUS, AND IMAGE FORMING METHOD CAPABLE OF PULL PRINTING WITHOUT KEY INPUT WITH NO SERVER

(71) Applicant: KYOCERA Document Solutions Inc., Osaka (JP)

(72) Inventor: Naohiko Kosaka, Concord, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/836,541

(22) Filed: Mar. 31, 2020

(51) Int. Cl.
*H04N 1/00* (2006.01)
*H04N 1/44* (2006.01)
*G06F 3/12* (2006.01)

(52) U.S. Cl.
CPC ....... *H04N 1/00222* (2013.01); *G06F 3/1222* (2013.01); *G06F 3/1244* (2013.01); *H04N 1/0023* (2013.01); *H04N 1/00915* (2013.01); *H04N 1/4486* (2013.01); *G06F 3/1241* (2013.01); *G06F 3/1285* (2013.01); *G06F 3/1291* (2013.01)

(58) Field of Classification Search
None
See application file for complete search history.

(56) References Cited

U.S. PATENT DOCUMENTS

| | | | |
|---|---|---|---|
| 6,304,335 B1* | 10/2001 | Furuya | G06K 15/00 358/1.15 |
| 7,016,901 B2 | 3/2006 | Eikenbery | |
| 10,771,639 B1* | 9/2020 | Kosaka | G06F 3/1267 |
| 10,860,265 B2* | 12/2020 | Kosaka | G06F 3/1205 |
| 2018/0121620 A1* | 5/2018 | Bastide | H04W 12/126 |

* cited by examiner

*Primary Examiner* — Miya J Williams
(74) *Attorney, Agent, or Firm* — Hawaii Patent Services; Nathaniel K. Fedde; Kenton N. Fedde

(57) ABSTRACT

Provided is an image forming system for pull printing that does not require a server and does not require input of keys or the like at the time of output. A division part divides pull print document data into a plurality of blocks including a critical block that includes information required for printing and transfer blocks that include other information. A storing and transmitting part transmits the transfer blocks of the blocks to at least two of preserving apparatuses. A critical block acquisition part acquires the critical block. A transfer block acquisition part acquires each of the transfer blocks of the document data corresponding to the critical block from any of the preserving apparatuses. A document reproduction part collectively reproduces the critical block and each of the transfer blocks into the document data.

15 Claims, 8 Drawing Sheets

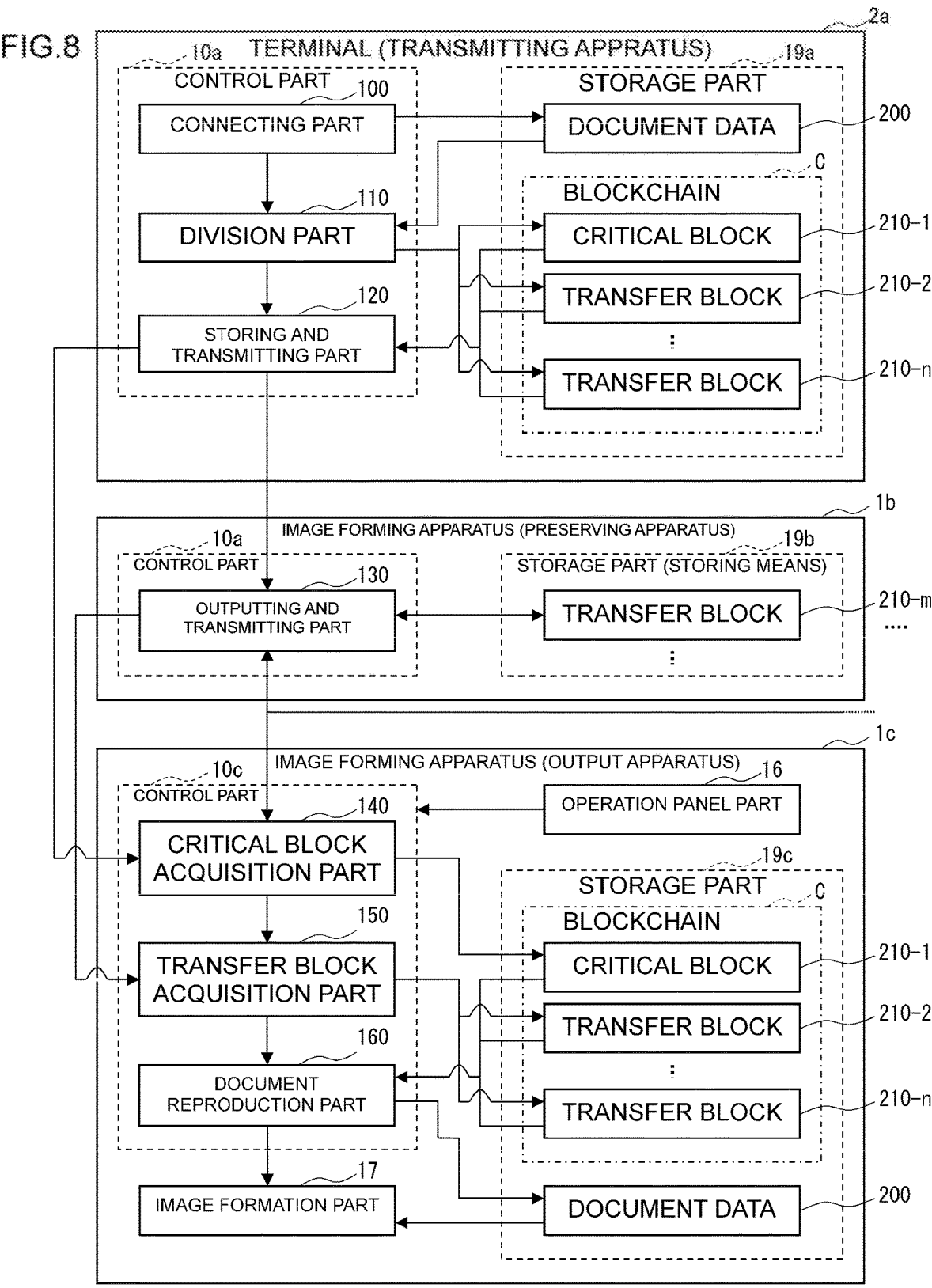

IMAGE FORMING SYSTEM, IMAGE FORMING APPARATUS, AND IMAGE FORMING METHOD CAPABLE OF PULL PRINTING WITHOUT KEY INPUT WITH NO SERVER

BACKGROUND

The present disclosure relates to an image forming system, an image forming apparatus, and an image forming method, and more particularly to an image forming system, an image forming apparatus, and an image forming method capable of pull printing.

There are image forming apparatuses such as a multifunctional peripheral (MFP) or the like capable of printing documents and images.

There is also an image forming system capable of pull printing that includes an image forming apparatus and a server. In this kind of a system, document data printed by a user is temporarily stored in a server. Then, the user is able to select and print the document data from an operation panel unit of the image forming apparatus.

On the other hand, a typical system for managing scanned data in a divided storage device when scanning a document also exists.

SUMMARY

An image forming system according to the present disclosure is an image forming system capable of pull printing and including a transmitting apparatus, a preserving apparatus and an output apparatus, wherein the transmitting apparatus includes: a division part configured to divide pull print document data into a plurality of blocks including a critical block that includes information required for printing and transfer blocks that include other information, and configured to create a blockchain of document data by sequentially calculating and including a previous hash value of a previous block; and a storing and transmitting part configured to transmit the transfer blocks of the blocks divided by the division part to at least two of the preserving apparatuses; and the preserving apparatus includes: a storing part configured to store the transfer blocks received from the transmitting apparatus; an outputting and transmitting part configured to transmit the transfer blocks stored in the storing part according to an instruction from the output apparatus; the output apparatus includes: a critical block acquisition part configured to acquire the critical block; a transfer block acquisition part configured to acquire each of the transfer blocks of the document data corresponding to the critical block acquired by the critical block acquisition part from any of the preserving apparatuses; a document reproduction part configured to collectively reproduce the critical blocks and each of the transfer blocks acquired by the transfer block acquisition part into the document data; and an image forming part configured to output document data reproduced by the document reproduction part.

An image forming apparatus according to the present disclosure includes: a critical block acquisition part configured to acquire a critical block including information required for printing of a blockchain into which the document data for pull printing is divided; a transfer block acquisition part configured to acquire each transfer block of the document data corresponding to the critical block acquired by the critical block acquisition part from any of a preserving apparatus; a document reproduction part configured to collectively reproduce the critical block and each of the transfer blocks acquired by the transfer block acquisition part into the document data; and an image forming part configured to output document data reproduced by the document reproduction part.

An image forming method according to the present disclosure is an image forming method executed by an image forming system capable of a pull printing and including a transmitting apparatus, preserving apparatuses, and an output apparatus, and comprising steps of: in the transmitting apparatus, dividing document data for pull printing into a plurality of blocks including a critical block that includes information required for printing and transfer blocks that include other information, and creating a blockchain of document data by sequentially calculating and including a previous hash value of a previous block; in the transmitting apparatus, transmitting the transfer blocks of the divided blocks to at least two preserving apparatuses; in the preserving apparatus, storing the transfer blocks received from the transmitting apparatus; in the output apparatus, acquiring the critical block; in the preserving apparatus, transmitting the stored transfer blocks according to an instruction from the output apparatus; in the output apparatus, acquiring each of the transfer blocks of the document data corresponding to the acquired critical block from any of the preserving apparatuses; in the output apparatus, collectively reproducing the acquired critical block and each of the transfer blocks to the document data; and in the output apparatus, outputting the reproduced document data.

BRIEF DESCRIPTION OF THE DRAWINGS

FIG. 8 is a block diagram illustrating a functional configuration of an image forming system according to another embodiment of the present disclosure.

DETAILED DESCRIPTION

Embodiments

[System Configuration of the Image Forming System X]

Figure 1:
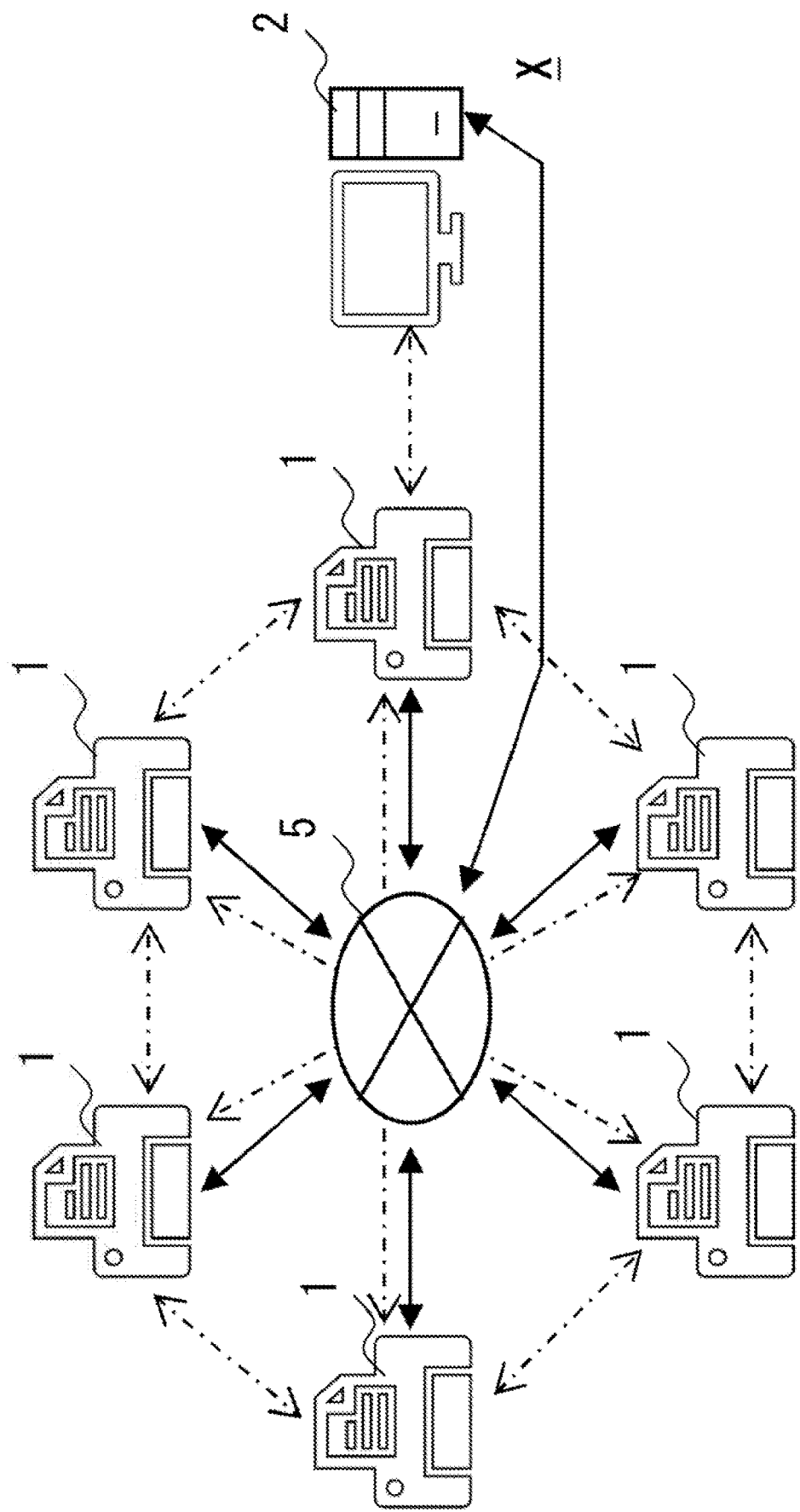
FIG. 1 is a system configuration diagram of an image forming system according to an embodiment of the present disclosure.
Figure 2:
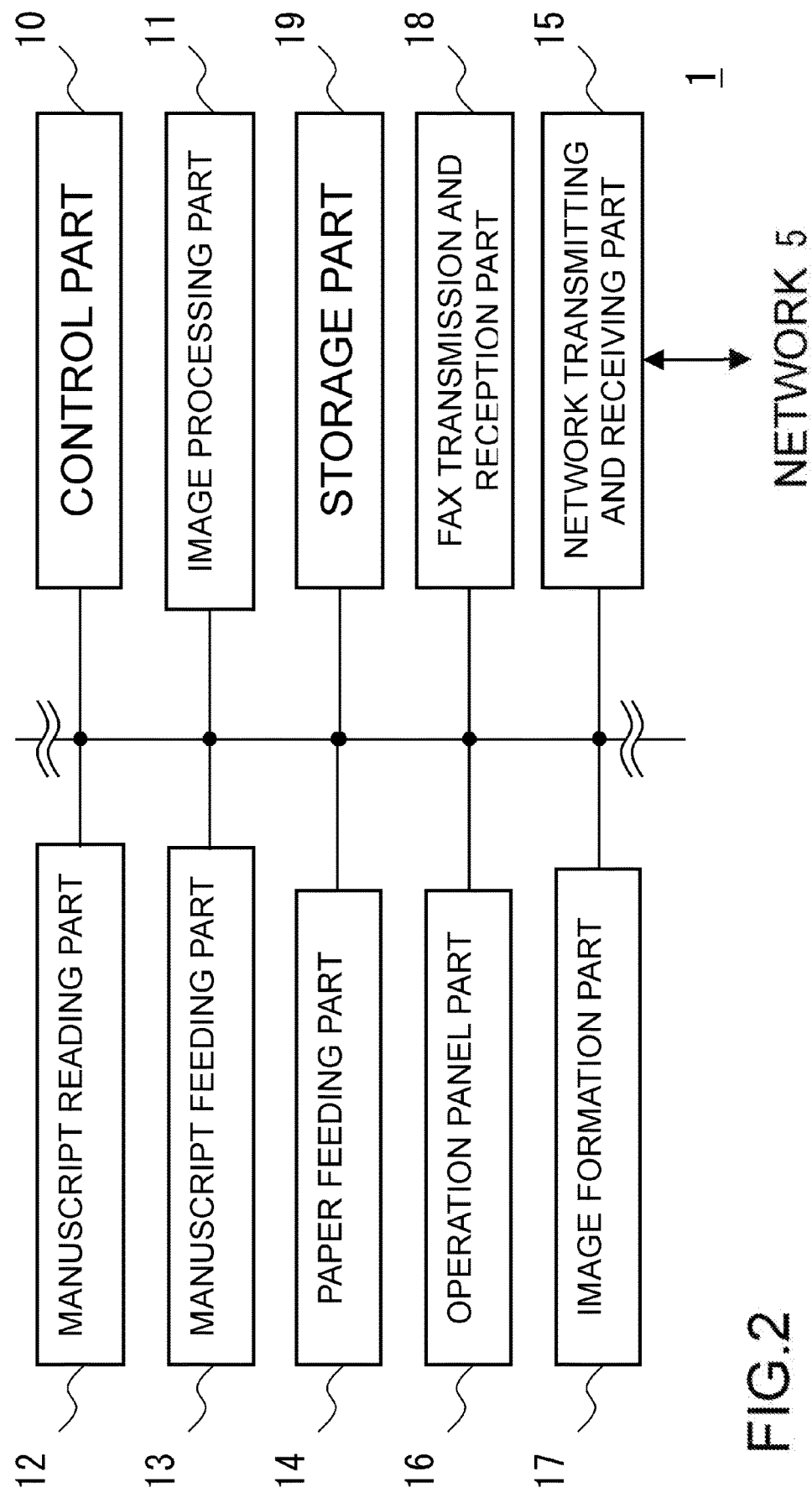
FIG. 2 is a block diagram illustrating a control configuration of an image forming apparatus illustrated in FIG. 1.
Figure 3:
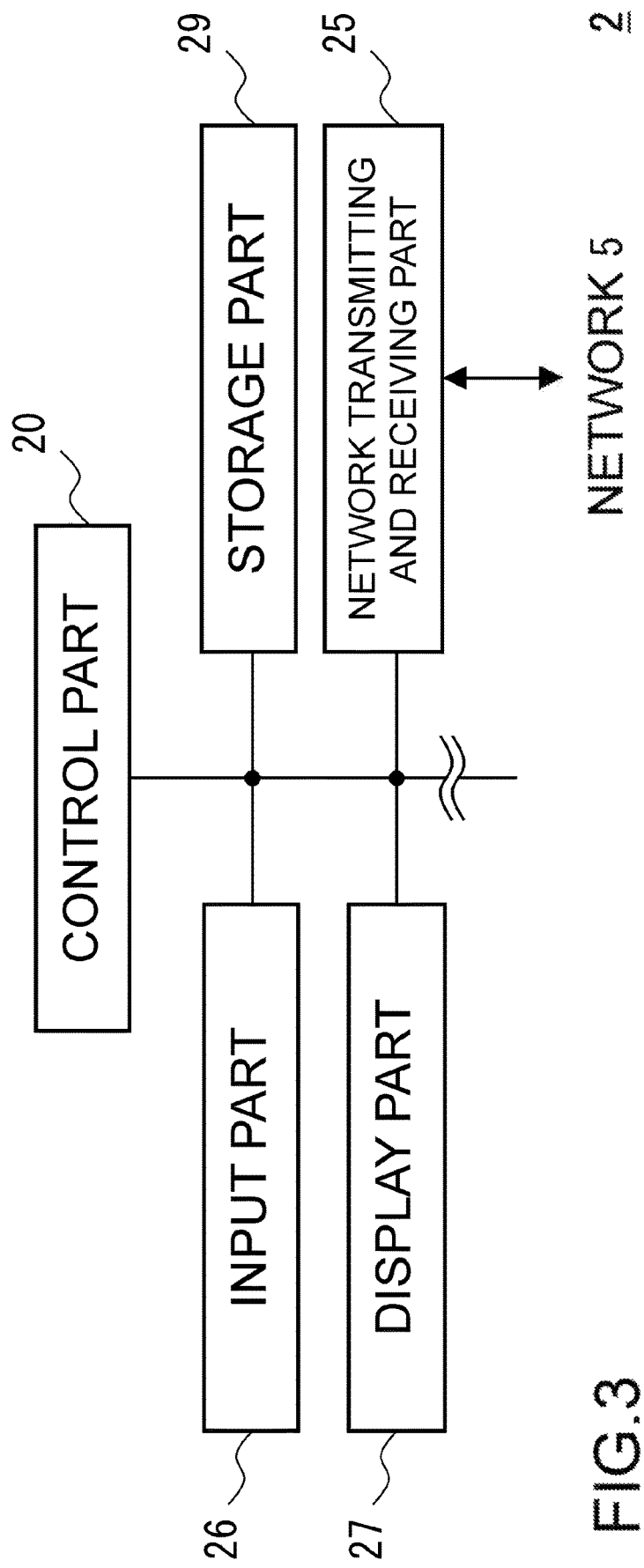
FIG. 3 is a block diagram illustrating a control configuration of a terminal illustrated in FIG. 1.

First, a system configuration of an image forming system X according to an embodiment of the present disclosure will be described with reference to FIG. 1 to FIG. 3.

Here, the image forming system X of the present embodiment is a distributed pull print printing system including a plurality of image forming apparatuses 1 and a terminal 2.

In the image forming system X of the present embodiment, each image forming apparatus 1 and the terminal 2 are connected via a network 5.

The image forming apparatus 1 is an information processing apparatus such as an MFP, a network scanner, a document scanner, a network FAX, a printer and the like capable of transmitting and receiving various kinds of data. The image forming apparatus 1 is also able to output document data 200 (FIG. 4) created by the terminal 2 by pull print printing, direct printing, copying, scanning, facsimile transmission, or the like. At this time, in the present embodiment, the image forming apparatus 1 performs pull printing by functioning as a transmitting apparatus, a preserving apparatus, and an output apparatus as will described below.

The terminal 2 is a terminal such as a PC, a mobile phone, a smartphone, a personal data assistant (PDA), a business-use terminal, a dedicated terminal or the like.

The terminal 2 runs various general-purpose operating systems (OS) and the like. Moreover, control programs such as a device driver or the like for the image forming apparatus 1 may be installed on the terminal 2. This makes it possible to use functions such as pull printing, direct printing, scanning, FAX transmission and reception, and network FAX and the like from the OS and various application software (hereinafter, application software will simply be referred to as an "app").

The network 5 is an intranet such as a local area network (LAN), or a wide area network (WAN) such as the Internet, a mobile phone network or the like. In a case where the network 5 is a LAN, the network 5 may be a wireless LAN such as WiFi or the like. In a case where the network 5 is a WAN, the network 5 may be connectable to a server on a so-called "cloud" via a router, a gateway, or the like. In addition, the network 5 may be connected to a plurality of networks by a virtual private network (VPN), a bridge, or the like.

Here, in the present embodiment, as indicated by a chain line, each image forming apparatus 1 functions as a node of a peer-to-peer (PtP) network. More specifically, the user may print the document data 200 (FIG. 4) from any image forming apparatus 1 in the same manner as in typical pull printing. However, in the present embodiment, each image forming apparatus 1, rather than being in a client/server relationship, accumulates data in a distributed manner and prints the data.

Therefore, as will be described later, the image forming apparatus 1 functions as any one, or any combination of a transmitting apparatus, a preserving apparatus, and an output apparatus.

(Configuration of the Image Forming Apparatus 1)

Next, a control configuration of the image forming apparatus 1 will be described with reference to FIG. 2.

The image forming apparatus 1 includes a control part 10, an image processing part 11, a manuscript reading part 12, a manuscript feeding part 13, a paper feeding part 14, a network transmitting and receiving part 15, an operation panel part 16, an image formation part 17 (image forming means), a FAX transmission and reception part 18, a storage part 19, and the like. Each part is connected to the control part 10, and the operation of each part is controlled by the control part 10.

The control part 10 is an information processing part such as a general purpose processor (GPP), a central processing unit (CPU), micro processing unit (MPU), digital signal processor (DSP), graphics processing unit (GPU), application specific integrated circuit (ASIC, application specific processor), or the like.

The control part 10 reads a control program stored in the ROM or the HDD of the storage part 19, expands the control program in the RAM, and executes the control program to operate as each part of a functional block described later. In addition, the control part 10 controls the entire apparatus according to specified instruction information that is inputted from an external terminal or the operation panel part 16.

The image processing part 11 is a control arithmetic means such as a digital signal processor (DSP), a graphics processing unit (GPU) or the like. The image processing part 11 performs specified image processing on image data. The specified image processing may be, for example, processing such as scaling, concentration tuning, gradation adjustment, image improvement or the like.

In addition, the image processing part 11 stores an image read by the manuscript reading part 12 in the storage part 19 as print data. At this time, the image processing part 11 can convert the print data into an electronic document such as a portable document format (PDF), various kinds of files such as a word processor file, a spreadsheet, or the like, or an image data file such as a TIFF file, a bitmap file or the like (hereinafter referred to as PDF and the like). Moreover, the image processing part 11 may also be capable of executing at least a part of an optical character recognition (OCR) process.

The manuscript reading part 12 reads the set manuscript. The manuscript reading part 12 is provided above the main body part of the image forming apparatus 1.

The manuscript reading part 12 includes a scanner, a platen glass, and a manuscript reading slit. When reading a manuscript placed on the platen glass, the manuscript reading part 12 moves the scanner to a position facing the platen glass and acquires image data by reading the manuscript placed on the platen glass while scanning the manuscript, and outputs the acquired image data to the control part 10.

In addition, in a case of reading a manuscript fed from the manuscript feeding part 13, the manuscript reading part 12 moves the scanner to a position facing the manuscript reading slit. Then, the manuscript reading part 12 reads the manuscript via the manuscript reading slit in synchronization with the manuscript feeding operation by the manuscript feeding part 13 and acquires image data. The manuscript reading part 12 outputs the acquired image data to the control part 10.

The manuscript feeding part 13 conveys a manuscript that is read by the manuscript reading part 12. The manuscript feeding part 13 is provided above the manuscript reading part 12.

The manuscript feeding part 13 includes a manuscript mounting part and a manuscript transport mechanism. The manuscript feeding part 13 sequentially feeds the manuscripts placed on the manuscript mounting part one by one by the manuscript transport mechanism and feeds the manuscripts to the manuscript reading part 12.

The paper feeding part 14 feeds recording paper one by one toward an image formation part 17. The paper feeding part 14 is provided in the main body part.

The network transmitting and receiving part 15 is a network connection part that includes a LAN board, a wireless transmitter receiver, or the like for connecting to a LAN, a wireless LAN, and an external network such as a WAN, a mobile phone network, and the like.

The network transmitting and receiving part 15 transmits and receives data on a data communication line, and transmits and receives audio signal by a voice telephone line.

The operation panel part 16 includes an input part such as buttons, a touch panel and the like, and a display part such as a liquid crystal display (LCD), an organic EL display, and the like. In addition, the operation panel part 16 is provided on the front side of the image forming apparatus 1.

The buttons of the input part of the operation panel part 16 include a numeric keypad, buttons for starting, canceling, switching operational modes, and giving instructions related to job execution and the like. The operational modes may include types of modes such as copying, FAX transmission, scanner, network scanner and the like. Moreover, the job includes printing, transmission, storage, recording, and the like of a selected document. The input part of the operation panel part 16 acquires instructions of various jobs of the image forming apparatus 1 by a user. In addition, it is also possible to input and change information of each user according to a user instruction acquired from the operation panel part 16.

The image formation part 17 is an image forming means according to the present embodiment. The image formation part 17 performs image formation on recording paper from data stored in the storage part 19, read by the manuscript reading part 12 or acquired from an external terminal.

The image formation part 17 includes a photo conductor drum, an exposure part, a developing part, a transfer part, a fixing part, and the like. The image formation part 17 records a toner image on recording paper by executing an image formation process including electrification, exposure, development, transfer, and fixing.

The FAX transmission and reception part 18 performs transmission and reception of facsimiles. The FAX transmission and reception part 18 is able to receive a facsimile from other FAX equipment via a voice line, store the received facsimile in the storage part 19, and cause the image formation part 17 to form an image. In addition, the FAX transmission and reception part 18 is able to convert data of a manuscript read by the manuscript reading part 12 or of a network FAX transmitted from an external terminal into image data, and transmit a facsimile it to other FAX equipment by a voice line.

The storage part 19 is a storage part using a non-transitory recording medium. The storage part 19 may include, for example, various kinds of random access memory (RAM) as a main storage part. In addition, the storage part 19 may include, for example, a read only memory (ROM), an embedded multi media card (eMMC), a solid state drive (SSD), a hard disk drive (HDD), or the like as an auxiliary memory part.

The main storage part of the storage part 19 may keep the stored contents by a function such as self-refresh or the like even in a power saving state.

A control program for controlling the operation of the image forming apparatus 1 is stored in the auxiliary memory part of the storage part 19. In addition, the storage part 19 also stores user account settings. The user Identification (ID), password, IP address of the terminal 2 owned by the user, other network addresses, and the like may be stored in the account settings.

In addition, the storage part 19 may include a storage folder area for each user.

Note that in the image forming apparatus 1, the control part 10 and the image processing part 11 may be integrally formed, such as a CPU with a built-in GPU, a chip-on-module package, a system on a chip (SOC), and the like.

Furthermore, the control part 10 and the image processing part 11 may include a RAM, a ROM, a flash memory, or the like.

(Configuration of the Terminal 2)

Next, the configuration of the terminal 2 will be described with reference to FIG. 3.

The terminal 2 includes a control part 20, a network transmitting and receiving part 25, an input part 26, a display part 27, a storage part 29, and the like.

The control part 20 is an information processing part such as a GPP, a CPU, an MPU, a DSP, a GPU, an ASIC or the like.

The input part 26 is a keyboard, various sensors, a pointing device, and the like for acquiring various kinds of instructions from a user. The pointing device includes a touch panel, a digitizer, a touch pad, or the like.

The input part 26 allows a user to input various kinds of instructions through a graphical user interface (GUI) on the OS, and may acquire the instructions. Moreover, it is also possible to perform processing such as generation and transmission of document data 200 (FIG. 4), input and change of information of each user, and the like, according to an instruction inputted by the user via the input part 26.

The display part 27 is a flat display panel such as an LCD, an organic EL display, a FED, a fluorescent display tube or the like, a projector, and a status display LED or the like. The display part 27 is able to display various operation screens related to the GUI.

In addition, the input part 26 and the display part 27 may be integrally formed such as a display with a touch panel, a digitizer, or the like.

The network transmitting and receiving part 25 is a network connection part including a LAN board, a wireless transmitter receiver, or the like for connecting to the network 5.

The storage part 29 is a storage part using a non-transitory recording medium. The storage part 29 may include a RAM, a ROM, an eMMC, an SSD, an HDD, or the like.

In addition, the storage part 29 may include an external storage medium such as various kinds of flash memory, optical recording media or the like.

Moreover, the storage part 29 may store a serial number or a unique ID for specifying the self apparatus, versions of the OS, firmware, device driver, and the like, and an apparatus ID such as an IP address, a MAC address or the like.

In addition, a control program for controlling the operation of the terminal 2 is stored in the auxiliary memory part of the storage part 29. This control program includes programs and data such as an OS and various applications and the like. Moreover, the control program also includes middleware that operates on the OS, a device driver for controlling the image forming apparatus 1, and the like.

Note that the control part 20 may include a RAM, a ROM, a flash memory, or the like.

In addition, the control part 20 reads the control program stored in the storage part 29, expands and executes the control program, and thereby operates as each part of a functional block described later.

[Functional Configuration of the Image Forming System X]

Figure 4:
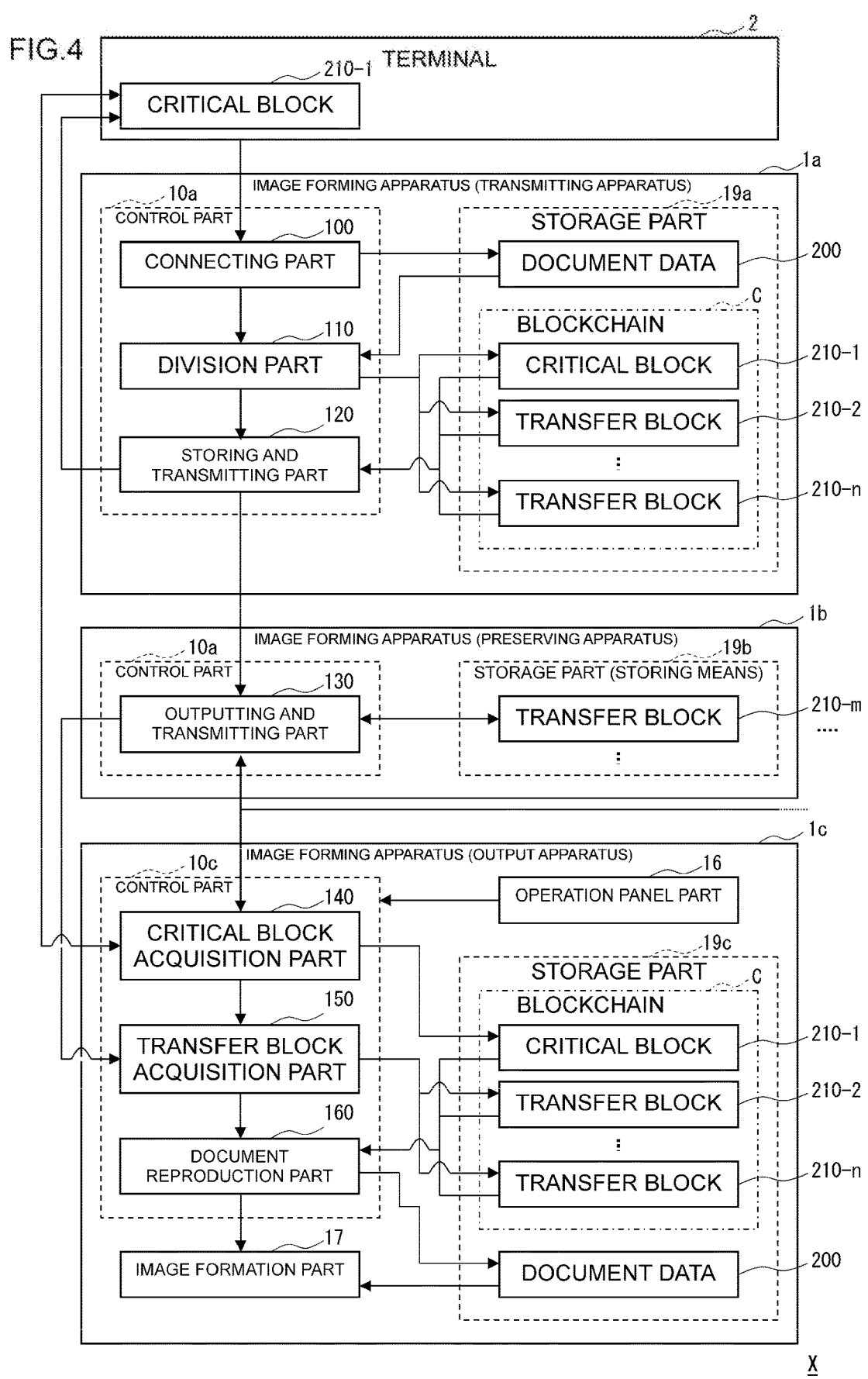
FIG. 4 is a block diagram illustrating a functional configuration of an image forming system according to an embodiment of the present disclosure.

Here, a functional configuration of the image forming system X according to an embodiment of the present disclosure will be described with reference to FIG. 4.

In the image forming system X of the present embodiment, when the user prints document data 200 at the terminal 2, one or any combination of the plurality of image forming apparatuses 1 functions as a transmitting apparatus, a preserving apparatus, and an output apparatus, and pull printing is executed.

Of these, the transmitting apparatus acquires document data 200 from the terminal 2, divides the document data 200 into a blockchain C, and transmits the divided data to the preserving apparatus. At this time, the transmitting apparatus transmits a critical block 210-1 that will be described in detail later to the terminal 2, and transmits the other transfer blocks 210-2 to 210-$n$ to any of the preserving apparatuses, respectively.

The preserving apparatus stores the transfer block 210-$m$, which is any one of the transfer blocks 210-2 to 210-$n$ among the blocks 210 of the blockchain C, and transmits the transfer block 210-$m$ according to an instruction from the output apparatus.

When the user selects printed document data 200 from the operation panel part 16, the output apparatus obtains the critical block from the terminal and obtains any one of the transfer blocks 210-2 to 210-$n$ from the preserving apparatus, then reproduces and prints the document data 200.

In the present embodiment, an example will be described in which the transmitting apparatus is an image forming apparatus 1$a$, one of the preserving apparatuses is an image forming apparatus 1$b$, and the output apparatus is an image forming apparatus 1$c$.

The control part 10$a$ of the image forming apparatus 1$a$ includes a connecting part 100, a division part 110, and a storing and transmitting part 120.

The storage part 19$a$ stores the document data 200, the critical block 210-1, and the transfer blocks 210-2 to 210-$n$.

The control part 10$b$ of the image forming apparatus 1$b$ includes an outputting and transmitting part 130.

The storage part 19$b$ stores the transfer block 210-$m$.

The control part 10$c$ of the image forming apparatus 1$c$ includes a critical block acquisition part 140, a transfer block acquisition part 150, a document reproduction part 160, and the image formation part 17.

The storage part 19$c$ stores the critical block 210-1, the transfer blocks 210-2 to 210-$n$, and the document data 200.

Note that the data stored in the storage part 19$a$, the storage part 19$b$, and the storage part 19$c$ may be different depending on the processing stage.

The connecting part 100 acquires the pull print document data 200 printed by the terminal 2 and stores that document data 200 in the storage part 19$a$.

The division part 110 divides the document data 200 for pull printing stored in the storage part 19$a$ into a plurality of blocks 210, and calculates and includes the previous hash value of the previous block in order, thereby creating a blockchain of document data.

In the present embodiment, the division part 110 divides the document data 200 into a critical block 210-1 that includes information necessary for printing and transfer blocks 210-2 to 210-$n$ that include other information. At this time, the division part 110 creates the blockchain C of the document data 200 by calculating and including the previous hash value 320 of the previous block 210 in order.

Then, the division part 110 creates identification information 400. Furthermore, the division part 110 acquires the hash value of the overall encrypted document data 200. This encryption is executed using, for example, using public key encryption or secret key encryption.

The storing and transmitting part 120 transmits each of the transfer blocks 210-2 to 210-$n$ among the blocks 210 divided by the division part 110 to at least two preserving apparatuses.

At this time, the storing and transmitting part 120 decreases the priority of transmission of the block 210 to a preserving apparatus that is likely to be in an offline state. On the contrary, the storing and transmitting part 120 increases the priority of transmission of the block 210 to a preserving apparatus having a high processing capacity and/or a short period since installation. Furthermore, the storing and transmitting part 120 suppresses transmission of the block 210 to a preserving apparatus that is expected to be in error.

On the other hand, the storing and transmitting part 120 transmits the critical block 210-1 to the terminal 2.

The outputting and transmitting part 130 stores the transfer block 210-$m$ that is any one of the transfer blocks 210-2 to 210-$n$ received from the transmitting apparatus in the storage part 19$b$. That is, in the present embodiment, the storage part 19$b$ functions as a storing means.

The outputting and transmitting part 130 transmits the transfer block 210-$m$ stored in the storage part 19$b$ according to an instruction from the output apparatus.

The critical block acquisition part 140 acquires the critical block 210-1. In the present embodiment, the critical block acquisition part 140 acquires the critical block 210-1 stored in the terminal 2 by logging in to the terminal 2 or the like.

The transfer block acquisition part 150 acquires each of the transfer blocks 210-2 to 210-$n$ of the document data 200 corresponding to the critical block 210-1 acquired by the critical block acquisition part 140 from any of the preserving apparatuses, and stores the transfer block in the storage part 19$c$.

At this time, the transfer block acquisition part 150 repeatedly calculates the previous hash value 320 from the last transfer block 210-$n$ to the transfer block 210-2 in the order of the blockchain C, and acquires the correct block 210.

The document reproduction part 160 collectively reproduces the critical block 210-1 acquired by the critical block acquisition part 140 and the transfer blocks 210-2 to 210-$n$ acquired by the transfer block acquisition part 150 to the document data 200.

Furthermore, in the present embodiment, the document reproduction part 160 transmits the reproduced document data 200 to the image formation part 17 to form an image and print it out.

The document data 200 is, for example, a "job" file for pull printing that is printed from an application of the terminal 2 by specifying pull printing in the device driver settings. The document data 200 may be described, for example, in page description language (PDL) or the like. Alternatively, the document data 200 may be, for example, electronic document data such as PDF or the like, a word processor or spreadsheet file, various image data, or the like. Furthermore, in the present embodiment, the document data 200 may be encrypted.

The critical block 210-1 and the transfer blocks 210-2 to 210-$n$ are blocks of data that configure the blockchain C. Hereinafter, when referring to any one of these, a block of data is simply referred to as a block 210.

In the present embodiment, the critical block 210-1 is data that includes required printing information 410 of the document data 200. On the other hand, the transfer blocks 210-2 to 210-$n$ are data stored in the preserving apparatus.

Figure 5:
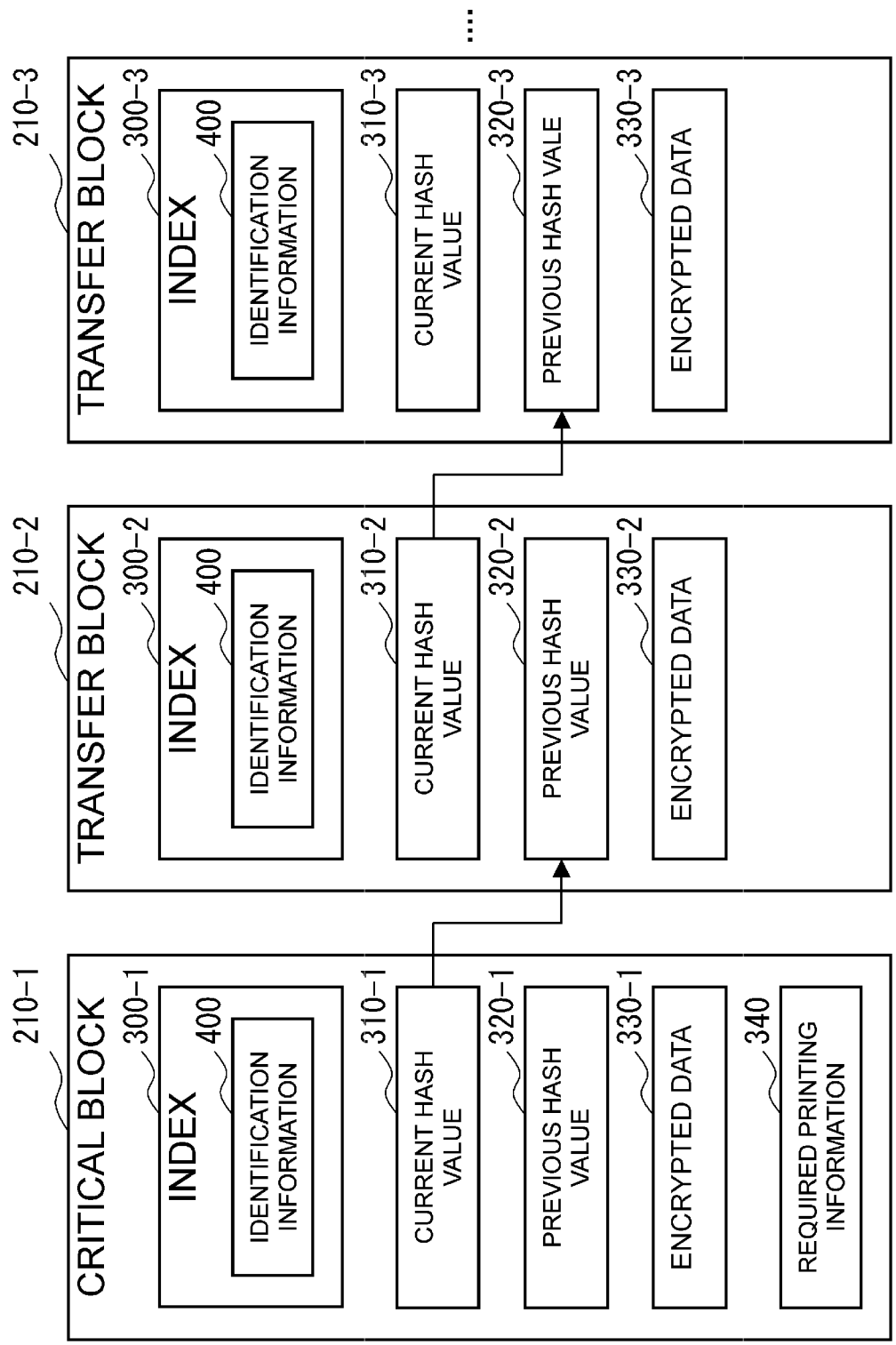
FIG. 5 is a block diagram illustrating a detailed configuration of a blockchain illustrated in FIG. 4.

The blockchain C will be described in detail with reference to FIG. 5.

The critical block 210-1 includes an index 300, a current hash value 310, a previous hash value 320, encrypted data 330, required printing information 410, and the like.

Each transfer block 210-2 to 210-$n$ includes an index 300, a current hash value 310, a previous hash value 320, encrypted data 330, and the like.

The index 300 is header data of each block 210 and the like. The header data includes, for example, an identifier indicating the block 210 of the image forming system X, the number of the arrangement order of each block 210, each definition of the data structure, and data such as an encryption method or the like.

In addition, the index 300 includes identification information 400. The identification information 400 is, for example, a hash value of the encrypted document data 200. In other words, in the present embodiment, the hash value of the file in a state before the document data 200 is encrypted and divided into the blocks 210 is used as the identification information 400. This hash value may be calculated by various hash functions such as generating a fixed-length bit string having no regularity from an arbitrary-length bit string. For the following hash values, a hash value may be calculated by a similar hash function.

The current hash value 310 is a hash value of the encrypted data 330 of the block 210. Alternatively, the current hash value 310 may be a value obtained by calculating a hash value of the entire block 210.

The previous hash value 320 is a hash value of the encrypted data 330 of the previous block 210. For example, this value may be the value copied from current hash value 310 of the previous block 210 in the arrangement order included in the index 300 and stored. In other words, as illustrated in FIG. 5, the previous hash value 320 of the block 210-2 is the same value as the current hash value 310-1 of the block 210-1, and the previous hash value 320 of the block 210-3 is the same value as the current hash value 310-2 of the block 210-2. Here, the previous hash value 320 of the block 210-1 may include a specific number such as "0" or the like or an indefinite number.

The encrypted data 330 is a main body of data obtained by dividing the encrypted document data 200.

The required printing information 410 is information required for printing the document data 200. More specifically, the required printing information 410 may include, for example, information included in the header of the document data 200, job information, print settings such as paper, color, and aggregate printing, and the like, an encryption key, and the like (hereinafter, referred to as "header, or the like").

Note that, in the block 210, the first critical block 210-1 and/or the last transfer block 210-n may also be added data other than these described above.

Here, the control part 10a of the image forming apparatus 1a, by executing the control program stored in the storage part 19a, is made to function as the connecting part 100, the division part 110, and the storing and transmitting part 120.

The control part 10b of the image forming apparatus 1b, by executing the control program stored in the storage part 19b, is made to function as the outputting and transmitting part 130.

The control part 10c of the image forming apparatus 1c, by executing the control program stored in the storage part 19c, is made to function as the critical block acquisition part 140, the transfer block acquisition part 150, and the document reproduction part 160.

In addition, each part of the image forming apparatus 1 described above is a hardware resource for executing the image forming method of the present disclosure.

Furthermore, a part of or any arbitrary combination of the functional configurations described above may be hardware-configured using an IC, a programmable logic, a field-programmable gate array (FPGA), or the like.

[Distributed Pull Printing Process by the Image Forming System X]

Figure 6:
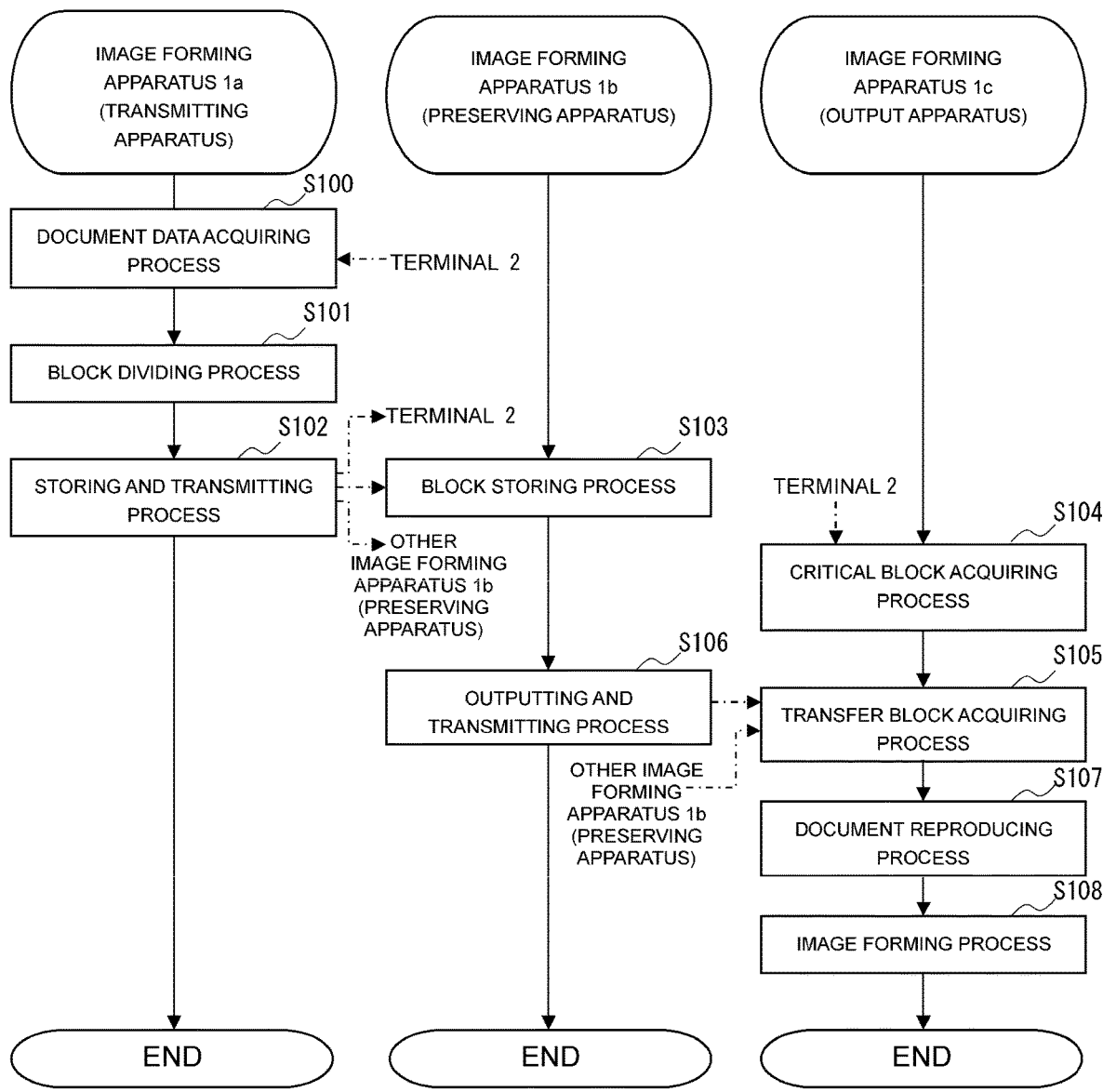
FIG. 6 is a flowchart of a distributed process according to an embodiment of the present disclosure.

Next, a description will be given of a distributed pull printing process by the image forming system X according to an embodiment of the present disclosure with reference to FIG. 6.

In the image forming system X of the present embodiment, as described above, each image forming apparatus 1 performs pull printing as the image forming apparatus 1a (transmitting apparatus), the image forming apparatus 1b (preserving apparatus), and the image forming apparatus 1c (output apparatus). At this time, a blockchain C is generated from the document data 200 by the image forming apparatus 1a. Then, the image forming apparatus 1a transmits the critical block 210-1 to the terminal 2 and stores it. Moreover, the image forming apparatus 1a transmits the transfer blocks 210-2 to 210-n to the image forming apparatus 1b and stores them. When the user selects the document data 200 by the image forming apparatus 1c, the critical block 210-1 is acquired from the terminal 2. Then, by the image forming apparatus 1c, transfer blocks 210-2 to 210-n of the document data 200 corresponding to the critical block 210-1 are acquired from each image forming apparatus 1b. Then, these are collectively reproduced and printed in the document data 200.

In the distributed pull printing process according to the present embodiment, the control part 10 of each image forming apparatus 1 executes a program stored in the storage part 19 by using hardware resources in cooperation with each part.

Hereinafter, the details of the distributed pull printing process will be described step by step with reference to the flowchart in FIG. 6.

(Step S100)
First, the connecting part 100 of the image forming apparatus 1a (transmitting apparatus) performs a document data acquiring process.

The user creates the document data 200 using various applications of the terminal 2 and specifies pull printing on the device driver. Then, the terminal 2 encrypts the document data 200 with the public key or the secret key and transmits the document data 200 to the image forming apparatus 1. At this time, the image forming apparatus 1 to which the document data 200 is transmitted is, for example, any one of the image forming apparatus 1 designated by the user, the image forming apparatus 1 most frequently used by the user, the nearest image forming apparatus 1 on the network 5, or the like. Then, the image forming apparatus 1 to which the document data 200 is transmitted functions as the image forming apparatus 1a that is the transmitting apparatus of the present embodiment.

After acquiring the document data 200, the connecting part 100 of the image forming apparatus 1a temporarily stores the document data 200 in the storage part 19a.

(Step S101)
Next, the division part 110 performs a block dividing process.

Here, the division part 110 creates the identification information 400 of the document data 200 and temporarily stores that identification information 400 in the storage part 19a. In the present embodiment, the identification information 400 is a hash value of the entire encrypted document data 200 (a hash value of the document data 200).

Next, the division part 110 divides the document data 200 into blockchain C. The division part 110 divides the document data 200 into a critical block 210-1 and transfer blocks 210-2 to 210-n.

Among these, as the size of each block 210, for example, it is preferable to use a fixed value such as 128 KB (kilobyte), 256 KB, 512 KB or the like. Alternatively, the size of each block 210 may be variable depending on the total number of the image forming apparatuses 1 configuring the image forming system X. Furthermore, the size of the critical block 210-1 and the sizes of the transfer blocks 210-2 to 210-$n$ may be different.

Then, the division part 110 divides the encrypted document data 200 into encrypted data 330 corresponding to the size of the block 210 and includes the encrypted data 330, and calculates and includes a current hash value 310 for the encrypted data 330 of each block 210. The division part 110 generates the blockchain C of the document data 200 by including the previous hash value 320 of the previous block 210 in order for each block 210. In other words, the critical block 210-1 and the transfer blocks 210-2 to 210-$n$ are configured as the blockchain C by being connected by the previous hash value 320.

Furthermore, the division part 110 includes the header and the like of the document in the required printing information 410 of the critical block 210-1.
(Step S102)

Next, the storing and transmitting part 120 performs a storing and transmitting process.

The storing and transmitting part 120 transmits each of the divided transfer blocks 210-2 to 210-$n$ to the image forming apparatus 1$b$ (preserving apparatus) that is a different node. Here, in the present embodiment, each of the transfer blocks 210-2 to 210-$n$ is stored in at least two image forming apparatuses 1$b$. This is to make it possible to cope with a case where the preserving apparatus that stores the transfer blocks 210-2 to 210-$n$ becomes offline or unreachable.

More specifically, the storing and transmitting part 120 decreases the priority of transmission of the transfer blocks 210-2 to 210-$n$ to the preserving apparatus that tends to become offline. Furthermore, the storing and transmitting part 120 increases the priority of transmission of the transfer blocks 210-2 to 210-$n$ to a preserving apparatus having a high processing capacity and/or a short period since installation. In addition, the storing and transmitting part 120 suppresses transmission of the transfer blocks 210-2 to 210-$n$ to a preserving apparatus that is expected to be in error.

As described above, by transferring each of the transfer blocks 210-2 to 210-$n$ of the blockchain C to each of the image forming apparatuses 1$b$ of the nodes constituting the image forming system X, the encrypted document data 200 is distributed and stored.

On the other hand, since the critical block 210-1 is held in the terminal 2, it is not possible to reproduce the document data 200 by only collecting the transfer blocks 210-2 to 210-$n$.

After that, the storing and transmitting unit 120 transmits the critical block 210-1 to the terminal 2 and causes the terminal 2 to be stored. This transmission can be executed by a command of a device driver or the like corresponding to a reply when the document data 200 is transmitted. Alternatively, the storing and transmitting part 120 is able to perform transmission via e-mail, FTP (File Transfer Protocol), or the like.

The terminal 2 receives the critical block 210-1 from the image forming apparatus 1$a$ and stores the critical block 210-1 in a built-in storage part.
(Step S103)

Next, the outputting and transmitting part 130 of the image forming apparatus 1$b$ (preserving apparatus) performs a block storing process. Here, one process of the image forming apparatus 1$b$ will be described.

The outputting and transmitting part 130 receives the transfer block 210-$m$, which is any one of the transfer blocks 210-2 to 210-$n$, from the transmitting apparatus, and stores the transfer block 210-$m$ in the storage part 19$b$ (storing means). At this time, a plurality of transfer blocks 210-$m$ may be received, and the order in the index 300 may be different.
(Step S104)

Here, the critical block acquisition part 140 of the image forming apparatus 1$c$ (output apparatus) performs a critical block acquiring process.

In the present embodiment, when a user logs in using the operation panel unit 16 or the like, the critical block acquisition part 140 connects to the terminal 2 of the user. This connection may be performed between the image forming apparatus 1$c$ and the device driver of the terminal 2 using, for example, the HTTPS protocol or the like that passes through a firewall. At this time, the critical block acquisition part 140 is able to search for the terminal 2 of the user on the network 5 based on the account settings stored in the storage part 19$c$. If this connection is successful, the critical block acquisition part 140 acquires the critical block 210-1 stored in the terminal 2, and stores the critical block 210-1 in the storage part 19$c$.
(Steps S105 and S106)

Next, the transfer block acquisition part 150 of the image forming apparatus 1$c$ (output apparatus) acquires each of the transfer blocks 210-2 to 210-$n$, which corresponds to the acquired critical block 210-1, from any one of the preserving apparatuses, and stores the transfer blocks in the storage part 19$b$.

At this time, the transfer block acquisition part 150 acquires the blocks 210 from the last to the first in the reverse order of the order in the index 300. In other words, in this process, the blocks 210 from the transfer block 210-$n$ to the transfer block 210-2 are acquired.

Therefore, the transfer block acquisition part 150, by performing a broadcast or the like to the network 5, gives an instruction to transmit the transfer block 210-$m$ to be acquired.

Here, the outputting and transmitting part 130 of the image forming apparatus 1$b$ (preserving apparatus) performs an outputting and transmitting process.

The outputting and transmitting part 130, according to the instruction from the image forming apparatus 1$c$, which is an output apparatus, transmits the transfer block 210-$m$ stored in the storage part 19$b$ to the image forming apparatus 1$c$.

After acquiring the transfer block 210-$m$, the transfer block acquisition part 150 of the image forming apparatus 1$c$ calculates again the current hash value 310 of the encrypted data 330-$m$ of the transfer block 210-$m$, and then confirms that the current hash value 310 is the same as the previous hash value 320 of the block 210 next in order and is correct. In a case where these values are different, the transfer block acquisition part 150 determines that the block 210 has been tampered with or has corrupted data, and may acquire the correct transfer block 210-$m$ again, or set an error.

In a case where the correct transfer block 210-$m$ is acquired, the transfer block acquisition part 150 repeats the previous block 210, receives and acquires from the node having the requested block 210, and acquires the transfer blocks 210-2 to 210-$n$ of the entire blockchain C.
(Step S107)

In a case where all the critical blocks 210-1 and the transfer blocks 210-2 to 210-$n$ of the blockchain C are acquired, the document reproduction part 160 of the image forming apparatus 1c (output apparatus) performs a document reproducing process.

The document reproduction part 160 collectively reproduces the acquired critical block 210-1 and the transfer blocks 210-2 to 210-n to the document data 200.

At this time, the document reproduction part 160 generates document data 200 in an unencrypted state by combining and decrypting the encrypted data 330 of each block 210, and stores that document data 200 in the storage part 19c. (Step S108)

Next, the document reproduction part 160 and the image formation part 17 perform an image formation process.

The document reproduction part 160 causes the image formation part 17 to output the reproduced document data 200 on recording paper. Accordingly, the reproduced document data 200 may be outputted.

Alternatively, the document reproduction part 160 may convert the document data 200 into a file such as PDF or the like, and transmit the file by facsimile, or transmit by mail or messenger.

Thus, the distributed pull printing process according to an embodiment of the present disclosure is completed.

With the configuration described above, the following effects may be obtained.

In conventional pull printing a client-server environment is required. In other words, a server for transmitting the document data 200 from a terminal is required.

On the other hand, a typical network scan system manages data scanned by divided storage apparatuses. However, this system is not able to handle pull printing.

On the other hand, the image forming system X according to an embodiment of the present disclosure includes an image forming apparatus 1a (transmitting apparatus), a plurality of image forming devices 1b (preserving apparatuses), and an image forming device 1c (output apparatus), and is capable of pull printing. The image forming apparatus 1a includes a division part 110 and a storing and transmitting part 120. The division part 110 divides the pull print document data 200 into a plurality of blocks including a critical block 210-1 that includes information required for printing and transfer blocks 210-2 to 210-n that include other information, and by sequentially calculating and including the previous hash value of the previous block, creates a blockchain of document data 200. The storing and transmitting part 120 transmits the transfer blocks 210-2 to 210-n of the blocks 210 divided by the division part 110 to at least two preserving apparatuses. Any one of the image forming apparatuses 1b includes a storing part and an outputting and transmitting part 130. The storing part stores any one of the transfer blocks 210-2 to 210-n received from the transmitting apparatus. The outputting and transmitting part 130 transmits any one of the transfer blocks 210-2 to 210-n stored in the storing part in accordance with an instruction from the output apparatus. The image forming apparatus 1c includes a critical block acquisition part 140, a transfer block acquisition part 150, a document reproduction part 160, and an image formation part. The critical block acquisition part 140 acquires the critical block 210-1. The transfer block acquisition part 150 acquires each of the transfer blocks 210-2 to 210-n of the document data 200 corresponding to the critical block 210-1 acquired by the critical block acquisition part 140 from any one of the image forming apparatuses 1b. The document reproduction part 160 collectively reproduces the critical block 210-1 and the each of transfer blocks 210-2 to 210-n acquired by the transfer block acquisition part to the document data 200. The image formation part outputs the document data 200 reproduced by the document reproduction part 160.

With this configuration, it is possible to provide a distributed type image forming system for pull printing that does not require a server. In other words, a distributed type image forming system that does not require a client-server environment may be configured. Thus, printing by pull printing may be achieved anywhere.

In addition, in the image forming system X of the present embodiment, the critical block 210-1 is stored in the terminal 2, so the document data 200 may not be reproduced by only collecting just the transfer blocks 210-2 to 210-n. For this reason, security can be improved as compared with storing all the blocks 210 in the image forming apparatus 1.

Furthermore, in a typical image forming system, the document data 200 is printed by pull printing, so the server needs to be reachable from the image forming apparatus that will perform printing.

On the other hand, in the image forming system X of the present embodiment, when the user terminal 2 is able to be connected to the image forming apparatus 1a (transmitting apparatus), when the image forming apparatus 1a and the image forming apparatus 1b (preserving apparatus) are able to be connected, and when the image forming apparatus 1b and the image forming apparatus 1c (output apparatus) are able to be connected, pull printing of the document data 200 becomes possible. In other words, not all apparatus need to be reachable via the network 5. Therefore, pull printing may be realized without changing the network structure. Furthermore, even in an environment where only a specific apparatus is bridge-connected via a WAN or the like, pull printing may be performed from a remote output apparatus.

In addition, in the image forming system X of the present embodiment, the transfer blocks 210-2 to 210-n are collected from the preserving apparatuses which are a large number of nodes, so the bandwidth and the time may be suppressed and cost may be reduced more than when collecting blocks via a server.

Furthermore, in the present embodiment, the transfer blocks 210-2 to 210-n are stored and held so as to be scattered over different nodes, using the document data 200 as a blockchain C. Therefore, changing or hacking the document data 200 becomes difficult. In other words, the accuracy of the document data 200 may be secured.

Furthermore, the terminal 2 stores the critical block 210-1 including information required as a document, so it is difficult to reproduce the document even in a case where the transfer blocks 210-2 to 210-n are acquired. For this reason, security may be improved.

Further, in a typical technique, the time required to complete printing was affected depending on the state of the server.

However, in the image forming system X of the present embodiment, the transfer blocks 210-2 to 210-n are stored in a preserving apparatus serving as a plurality of nodes. For this reason, even in a case where one preserving apparatus is offline or the operation is slow in a busy state, the transfer blocks 210-2 to 210-n may be acquired from a preserving apparatus that is able to transmit data quickly. Therefore, the possibility that pull printing of the document data 200 may be performed in a short time is increased.

Furthermore, in the image forming system X of the present embodiment, copying of the transfer blocks 210-2 to 210-n is not performed except by the transmitting apparatus, and no copying or the like is performed after transmission.

For this reason, it is possible to reduce the bandwidth and the storage capacity of the preserving apparatus even in distributed type system.

In the image forming system X according to an embodiment of the present disclosure, the storing and transmitting part 120 decreases the priority of transmission of the transfer blocks 210-2 to 210-n to a preserving apparatus that tends to be in the offline state, increases the priority of transmission of the transfer blocks 210-2 to 210-n to a preserving apparatus having high processing capacity and/or short period since installation, and suppress the transmission of the transfer blocks 210-2 to 210-n to a preserving apparatus expected to be in error.

With this kind of configuration, the block 210 can be reliably stored in the preserving apparatus, and it is possible to increase the possibility that the output apparatus will acquire the blockchain quickly. Therefore, pull printing of the document data 200 can be reliably performed.

In the image forming system X according to an embodiment of the present disclosure, the transfer block acquisition part 150 acquires the correct transfer block 210-m by repeatedly calculating the previous hash value 320 from the last transfer block 210-n in the order.

With this kind of a configuration, even in a case where the transfer blocks 210-2 to 210-n are tampered with, data is damaged or the like, it is possible to confirm the transfer blocks 210-2 to 210-n by the hash value. Therefore, even in a case where an illegal block 210 is mixed in, tempering, hacking, and the like of the document data 200 may be prevented.

In the image forming system X according to an embodiment of the present disclosure, the transmitting apparatus is the image forming apparatus 1a, and the storing and transmitting part 120 transmits the critical block 210-1 to the user terminal 2 to be stored.

With this kind of configuration, the image forming apparatus 1c, which is an output apparatus, acquires the critical block 210-1 from the terminal 2 just by logging in or the like, and accordingly, may easily output the document data 200 by pull printing. Moreover, security may be ensured by storing the critical block 210-1 in the terminal 2 owned by the user.

Other Embodiments

Note that in the image forming system X of the embodiments described above, a configuration in which a fixed terminal such as a PC or the like is used as the terminal 2 is described.

Figure 7:
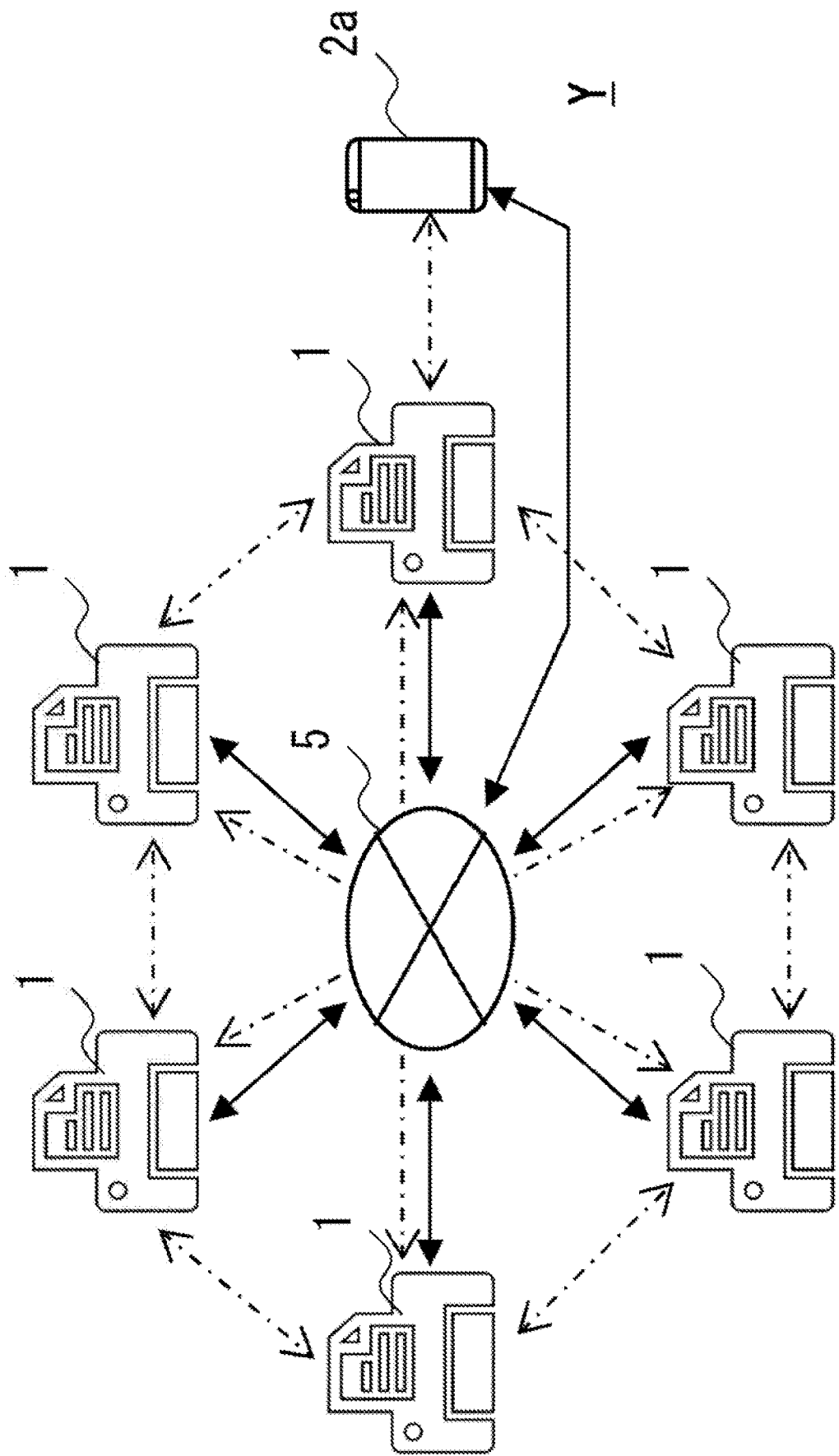
FIG. 7 is a block diagram illustrating a functional configuration of an image forming system according to another embodiment of the present disclosure.

However, as illustrated in FIG. 7, a portable terminal 2a may be used as in the image forming system Y according to another embodiment of the present disclosure.

Furthermore, in the embodiments described above, an example has been described in which the document data 200 is divided into a blockchain and transmitted by using the image forming apparatus 1a as a transmitting apparatus.

On the other hand, as illustrated in FIG. 8, in the image forming system Y, instead of the image forming apparatus 1a, the terminal 2a may divide the document data 200 into a critical block 210-1 and the transfer blocks 210-2 to 210-n.

In this case, processing such as storing the critical block 210-1 in the terminal 2a, and transmitting the transfer blocks 210-2 to 210-n to the image forming apparatus 1b serving as a preserving apparatus may be performed.

This eliminates the need to process the document data 200 in the image forming apparatus 1a, and it becomes possible to reduce the processing load on the image forming apparatus 1a. In addition, there is no need to transmit and receive the critical block 210-1 between the image forming apparatus 1a and the terminal 2a, so the transmission load and processing load on the network may be reduced. Moreover, the dispersibility of the block 210 may be increased, and security may be improved.

Furthermore, configuration is possible so that when the terminal 2a is moved, the terminal 2a may connect to the image forming apparatus 1c at various positions.

In this case, it is possible to bring the terminal 2a close to the image forming apparatus 1c that is the output apparatus and directly access the terminal 2 from the image forming apparatus 1c that is the output apparatus. In other words, the critical block 210-1 may be directly transmitted from the terminal 2a to the image forming apparatus 1c simply by selecting pull printing or the like on the operation panel part 16 of the image forming apparatus 1c. In this case, it is also possible to transmit by a short-range wireless communication such as NFC, Bluetooth (registered trademark) or the like, or by a universal serial bus (USB) or the like without passing through the network 5.

With this kind of configuration, the user does not need to input identification information 400 and the like using the output apparatus, and thus convenience may be improved. Furthermore, it is possible to reliably acquire the critical block 210-1 using the output apparatus. Therefore, the possibility of reconstructing the document data 200 from the blockchain C may be increased.

Alternatively, as in the embodiments described above, a configuration is also possible in which the terminal 2 as a fixed terminal and the terminal 2a as a portable terminal are used at the same time.

In this case, the terminal 2a that is the portable terminal may store only the required printing information 410 and the identification information 400 of the critical block 210-1. Alternatively, it is also possible for terminal 2 that is the fixed terminal to store the critical block 210-1.

In this case, by simply connecting the terminal 2a that is a portable terminal to the output apparatus by short-range wireless communication, USB, or the like, the document data 200 may be reproduced without having to log in or the like. At this time, by including data such as login information, an encryption key or the like in the required printing information 410, it is possible to access the terminal 2 that is a fixed terminal.

With this kind of configuration, it is possible to flexibly cope with various configurations.

Alternatively, the identification information 400 of the document data 200 may include a character string that includes a user ID and a date, other IDs, and the like. In this case, the user data may be included in the document data 200 or the index 300 of the critical block 210-1 of the blockchain C.

In a case of this kind of configuration, it is possible to specify the blockchain C by the user simply logging in using the image forming apparatus 1c (output apparatus). Therefore, it is not necessary to input the identification information 400 separately.

In addition, the identification information 400 of the document data 200 may be a simple unique character string, random number key information, or the like.

In embodiments described above, an example has been described in which the critical block 210-1 is a single block at the head of the block 210.

However, the critical block need not be the first block in the blockchain, and may be a middle block, the last block, or a block at an arbitrary position. Furthermore, the critical block may be any arbitrary number of blocks.

Furthermore, when dividing the document data 200, it is possible to set which block 210 is to be the critical block by a user instruction, a random number, or the like. In this case, the identification information 400 may include information indicating which block 210 is the critical block. In addition, the critical block may include information such as a footer, keywords of the text, and the like.

Moreover, in the embodiments described above, an example has been described in which the hash value of the entire document data 200 is used as the identification information 400 of the document data 200.

However, the identification information 400 of the document data 200 may be a hash value of the last block 210 of the blockchain. In this case, according to FIG. 2 and FIG. 3, it is possible to use the current hash value 310-$n$ of the blockchain C as the identification information 400.

With this kind of configuration, the transfer block 210-$n$ may be easily identified, and the possibility of more quickly acquiring the blockchain C increases. In addition, it is not necessary to describe the order or the like in the index 300 of each block 210, so it becomes difficult to estimate the length of the blockchain C, and hacking or the like also becomes more difficult.

In the embodiments described above, an example has been described in which document data 200 is encrypted and transmitted by the terminal 2.

However, the document data 200 does not have to be encrypted. In that case as well, each block 210 may include the encrypted data 330.

In a case where the document data 200 is not encrypted, the identification information 400 itself may be encrypted and added, and the division part 110 may acquire a hash value before the document data 200 is encrypted.

In addition, the hash value of the entire document data 200 in an unencrypted state may be set as the previous hash value 320 of the critical block 210-1.

With this kind of configuration, it is possible to cope with various pull print configurations.

In the embodiments described above, an example is described in which the storing and transmitting part 120 of the image forming apparatus 1$a$ that is the transmitting apparatus, transmits the block 210 only to the image forming apparatus 1$b$ selected as the preserving apparatus.

However, the storing and transmitting part 120 may transmit the transfer blocks 210-2 to 210-$n$ to an image forming apparatus 1 that is not selected as the image forming apparatus 1$b$. In addition, the division part 110 may broadcast to all of the image forming apparatuses 1 that the blockchain C has been generated.

With this kind of configuration, even when the block 210 is not stored in each of the image forming apparatuses 1 serving as the nodes of the image forming apparatus X, the existence of the block 210 itself may be recorded as a history or the like.

Furthermore, each image forming apparatus 1 may be configured to store information indicating that the blockchain C of the encrypted document data 200 has been transmitted in a similar manner as in a typical pull print server.

With this kind of configuration, it is easy to confirm the history of the pull printing of the document data 200, and thus it is possible to enhance security.

Moreover, the present disclosure may be applied to information processing apparatuses other than an image forming apparatus. In other words, a configuration is also possible that uses a network scanner, a server or the like that is separately connected with a scanner with USB, or the like.

Moreover, the configurations and operations of the embodiments described above are examples, and it is needless to say that the configuration and operation may be appropriately modified and executed without departing from the spirit of the present disclosure.

What is claimed is:

1. An image forming system capable of pull printing and including a transmitting apparatus, a preserving apparatus and an output apparatus, wherein the transmitting apparatus comprises:
  a division part configured to divide pull print document data into a plurality of blocks including a critical block that includes information required for printing and transfer blocks that include other information; and configured to create a blockchain of document data by sequentially calculating and including a previous hash value of a previous block; and
  a storing and transmitting part configured to transmit the transfer blocks of the blocks divided by the division part to at least two of the preserving apparatuses; and the preserving apparatus comprises:
  a storing part configured to store the transfer blocks received from the transmitting apparatus;
  an outputting and transmitting part configured to transmits the transfer blocks stored in the storing part according to an instruction from the output apparatus;

the output apparatus comprises:
  a critical block acquisition part configured to acquire the critical block;
  a transfer block acquisition part configured to acquire each of the transfer blocks of the document data corresponding to the critical block acquired by the critical block acquisition part from any of the preserving apparatuses;

a document reproduction part configured to collectively reproduce the critical block and each of the transfer blocks acquired by the transfer block acquisition part into the document data; and
  an image forming part configured to output document data reproduced by the document reproduction part.

2. The image forming system according to claim 1, wherein
  the storing and transmitting part
  decreases priority of transmission of the transfer blocks to a preserving apparatus that is likely to be in an offline state;
  increases the priority of transmission of the transfer blocks to a preserving apparatus with high processing capacity and/or short period since installation; and
  suppresses transmission of the transfer blocks to a preserving apparatus that is expected to be in error.

3. The image forming system according to claim 1, wherein
  the transfer block acquisition part
  acquires correct transfer block by repeatedly calculating the previous hash value from last transfer block in order.

4. The image forming system according to claim 1, wherein
  the transmitting apparatus is an image forming apparatus; and
  the storing and transmitting part transmits the critical block to a user terminal.

5. The image forming system according to claim 1, wherein the transmitting apparatus
is a terminal used by a user for creating the document data, and stores the critical block.

6. An image forming apparatus, comprising:
a critical block acquisition part configured to acquire a critical block including information required for printing of a blockchain into which document data for pull printing is divided;
a transfer block acquisition part configured to acquire each of transfer blocks of the document data corresponding to the critical block acquired by the critical block acquisition part from any of preserving apparatuses;
a document reproduction part configured to collectively reproduce the critical block and each of the transfer blocks acquired by the transfer block acquisition part into the document data; and
an image forming part configured to output document data reproduced by the document reproduction part.

7. The image forming apparatus according to claim 6, further comprising:
a division part configured to divide pull print document data into a plurality of blocks including a critical block that includes information required for printing and transfer blocks that include other information; and configured to create a blockchain of document data by sequentially calculating and including a previous hash value of a previous block; and
a storing and transmitting part configured to transmit the transfer blocks of the blocks divided by the division part to at least two of the image forming apparatuses.

8. The image forming apparatus according to claim 7, wherein
the storing and transmitting part
decreases priority of transmission of the transfer blocks to a preserving apparatus that is likely to be in an offline state;
increases the priority of transmission of the transfer blocks to a preserving apparatus with high processing capacity and/or short period since installation; and
suppresses transmission of the transfer blocks to a preserving apparatus that is expected to be in error.

9. The image forming apparatus according to claim 7, wherein
the storing and transmitting part
transmits the critical block to a user terminal.

10. The image forming apparatus according to claim 6, wherein
the transfer block acquisition part
acquires correct transfer block by repeatedly calculating the previous hash value from last transfer block in order.

11. An image forming method executed by an image forming system capable of a pull printing and including a transmitting apparatus, preserving apparatuses, and an output apparatus, and comprising steps of:
in the transmitting apparatus,
dividing document data for pull printing into a plurality of blocks including a critical block that includes information required for printing and transfer blocks that include other information; and creating a blockchain of document data by sequentially calculating and including a previous hash value of a previous block;
in the transmitting apparatus,
transmitting the transfer blocks of the divided blocks to at least two preserving apparatuses;
in the preserving apparatus,
storing the transfer blocks received from the transmitting apparatus;
in the output apparatus,
acquiring the critical block;
in the preserving apparatus,
transmitting the stored transfer blocks according to an instruction from the output apparatus;
in the output apparatus,
acquiring each of the transfer blocks of the document data corresponding to the acquired critical block from any of the preserving apparatuses;
in the output apparatus,
collectively reproducing the acquired critical block and each of the transfer blocks to the document data; and
in the output apparatus,
outputting the reproduced document data.

12. The image forming method according to claim 11, wherein
in the transmitting apparatus,
decreasing priority of transmission of the transfer blocks to a preserving apparatus that is likely to be in an offline state;
in the transmitting apparatus,
increasing the priority of transmission of the transfer blocks to a preserving apparatus with high processing capacity and/or short period since installation; and
in the transmitting apparatus,
suppressing transmission of the transfer blocks to a preserving apparatus that is expected to be in error.

13. The image forming method according to claim 11, wherein
in the output apparatus,
acquiring correct transfer block by repeatedly calculating the previous hash value from last transfer block in order.

14. The image forming system according to claim 11, wherein
the transmitting apparatus is an image forming apparatus; and
in the transmitting apparatus,
transmitting the critical block to a user terminal.

15. The image forming method according to claim 11, wherein
the transmitting apparatus is a terminal used by a user for creating the document data, and
in the transmitting apparatus,
storing the critical block.

* * * * *